No. 786,632. PATENTED APR. 4, 1905.
T. C. DEXTER.
PAPER CUTTING MACHINE.
APPLICATION FILED MAY 21, 1902.
5 SHEETS—SHEET 3.
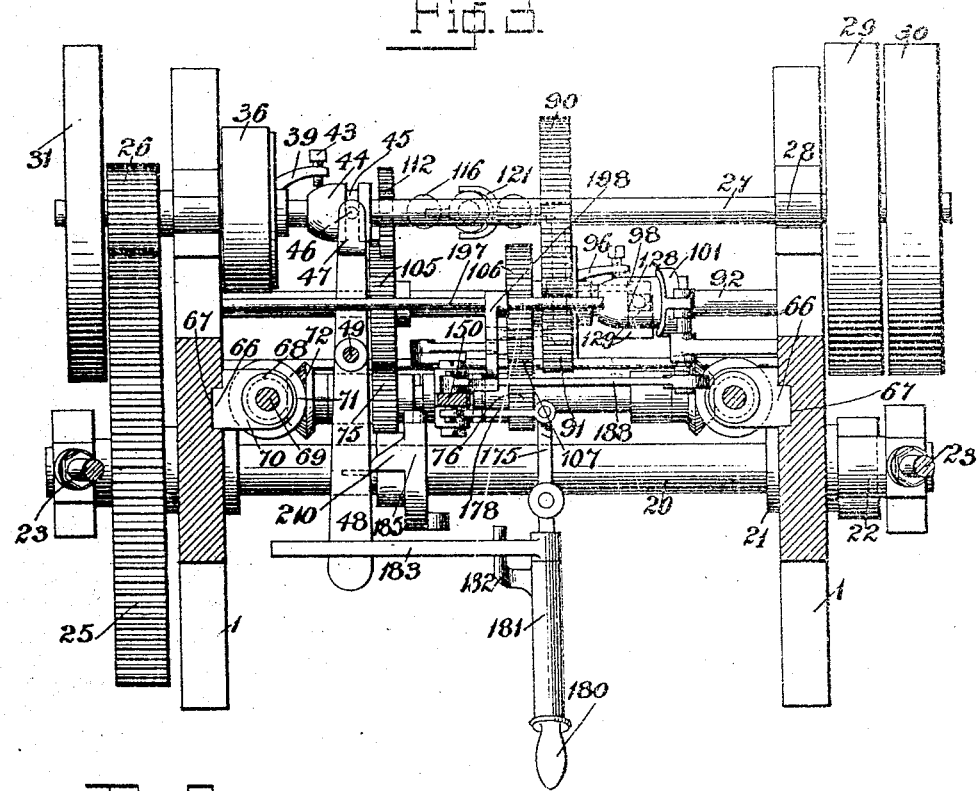
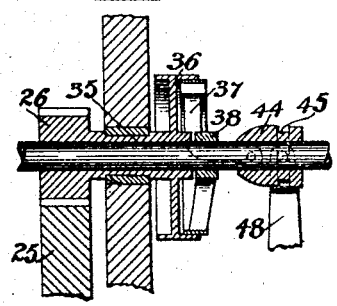
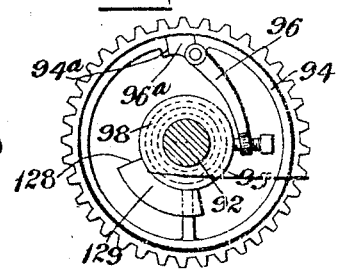
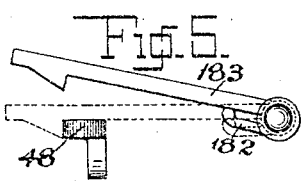
Witnesses
O. F. Somes
Wm. P. Hammond
Inventor
Talbot C. Dexter
By Knight Bros.
Attys.

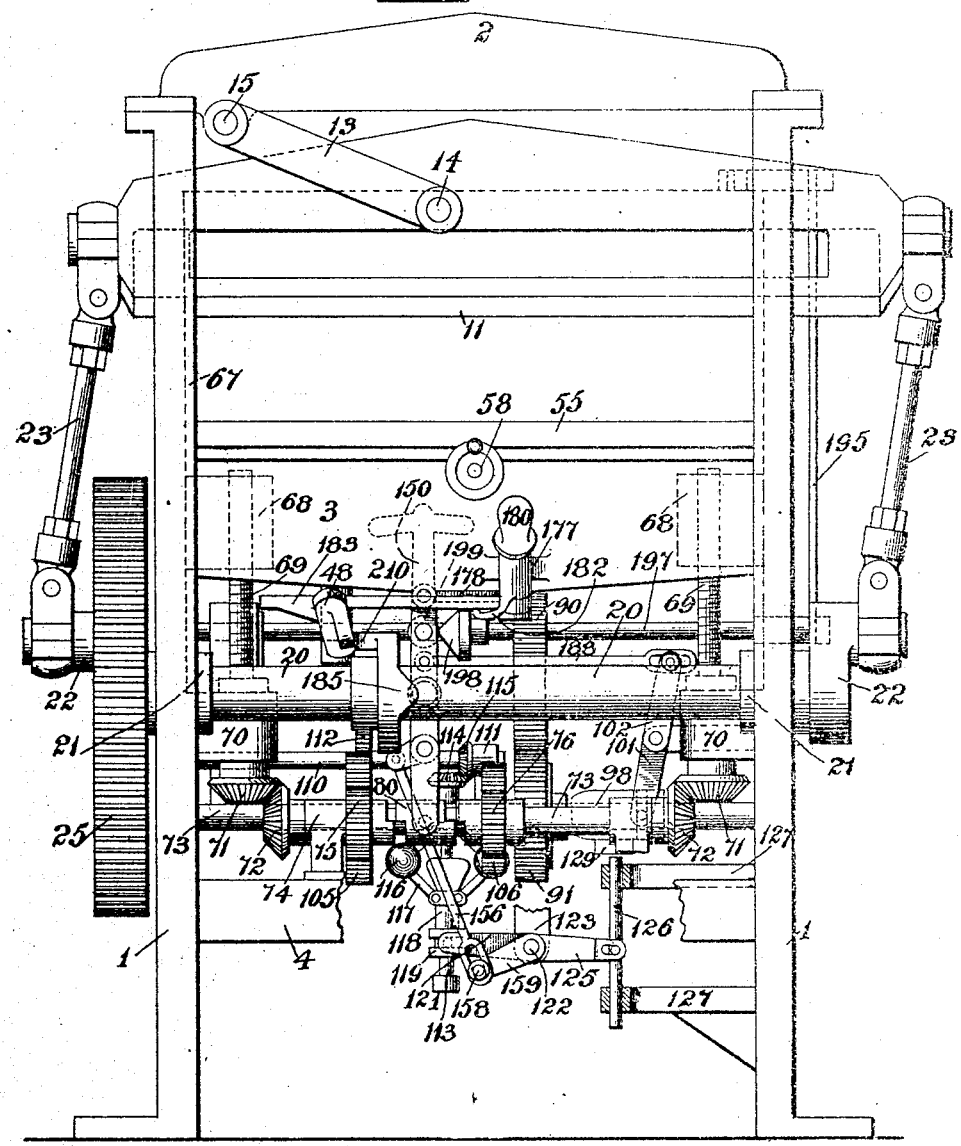

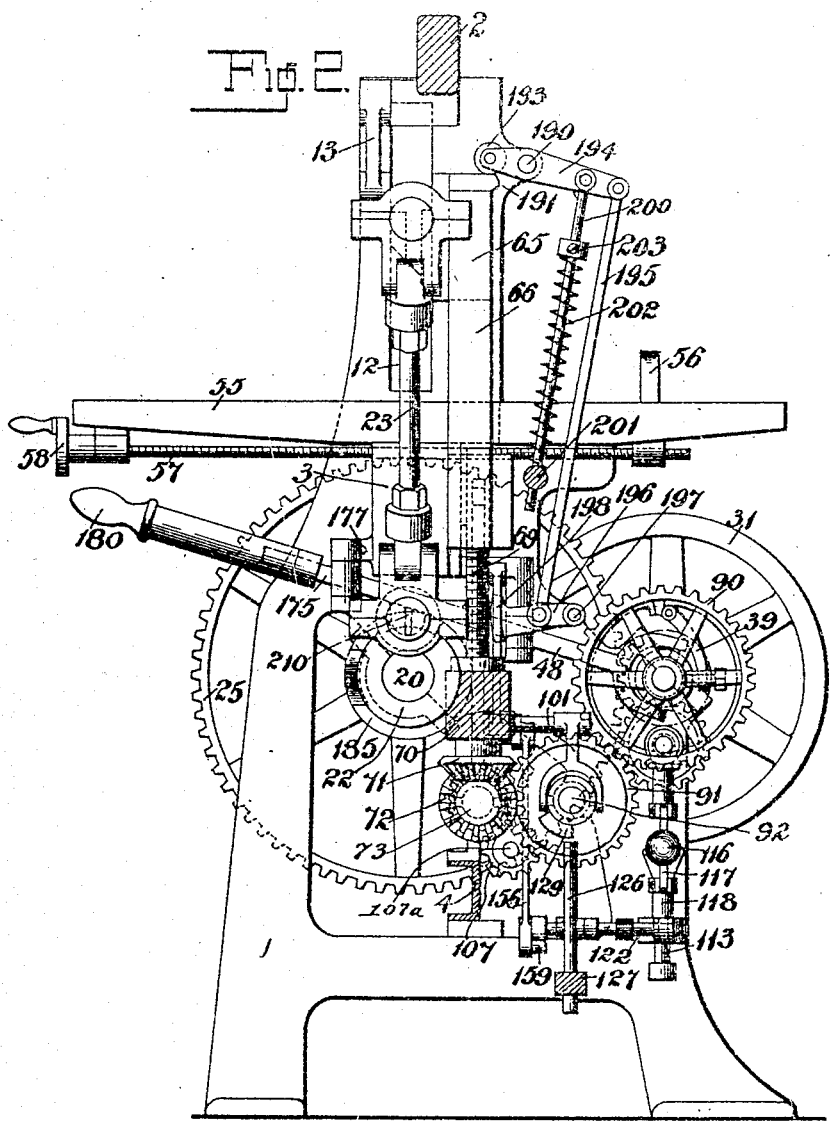

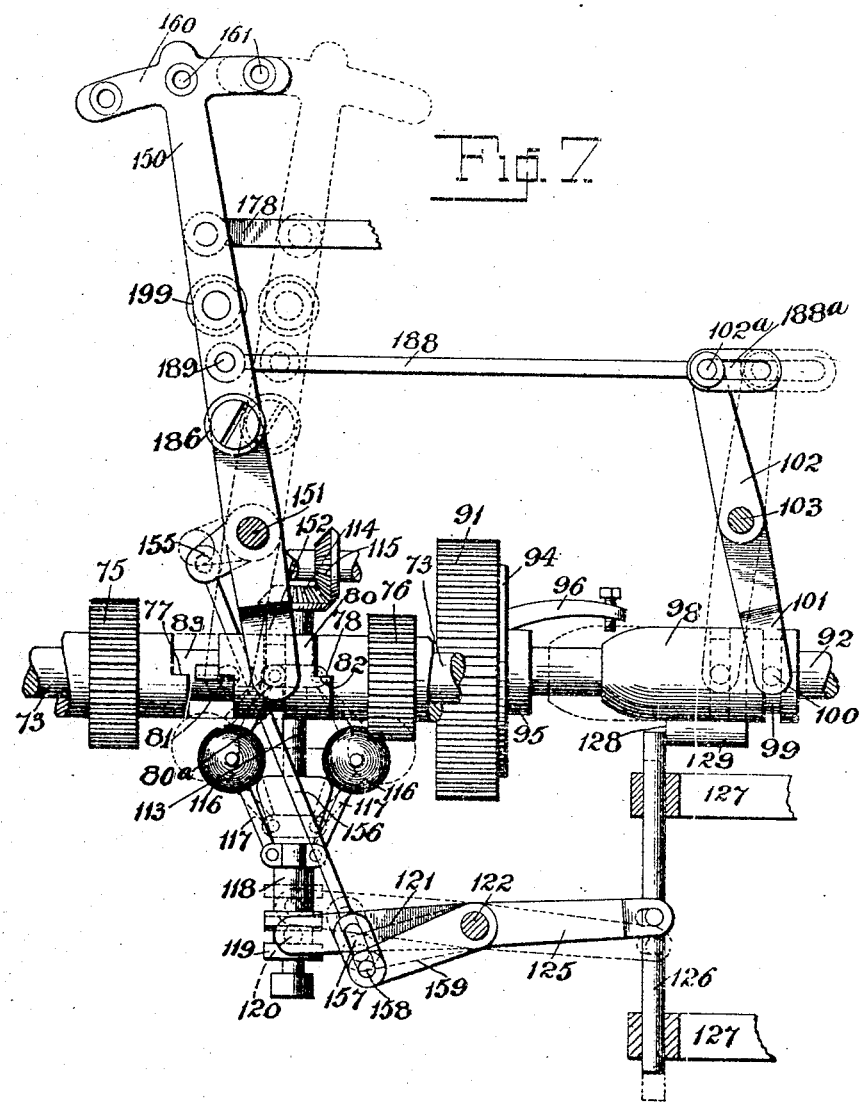

No. 786,632. PATENTED APR. 4, 1905.
T. C. DEXTER.
PAPER CUTTING MACHINE.
APPLICATION FILED MAY 21, 1902.
6 SHEETS—SHEET 5.
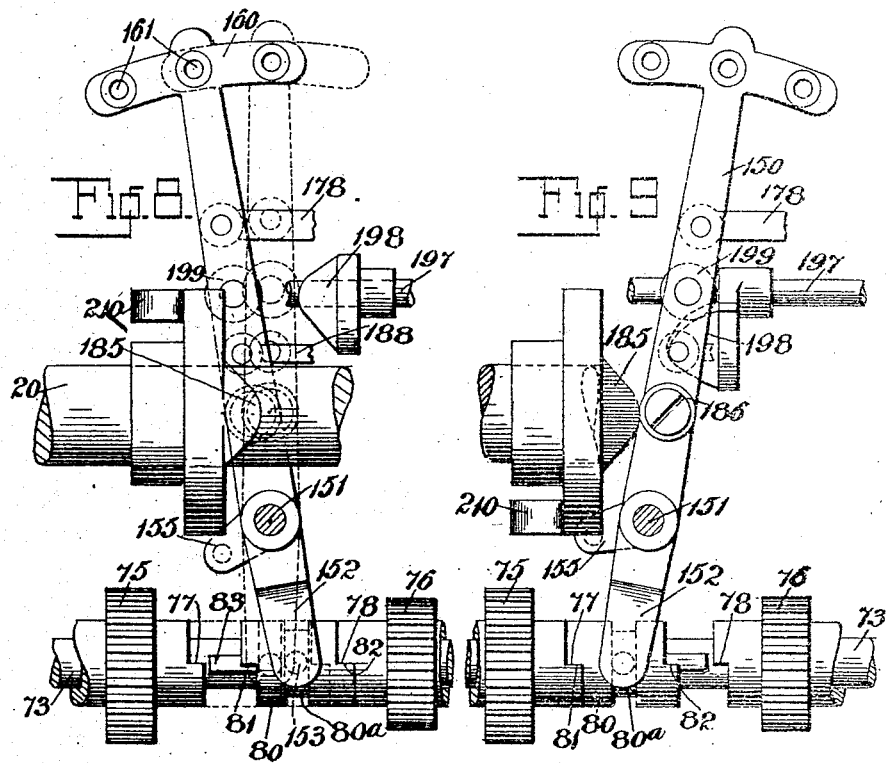
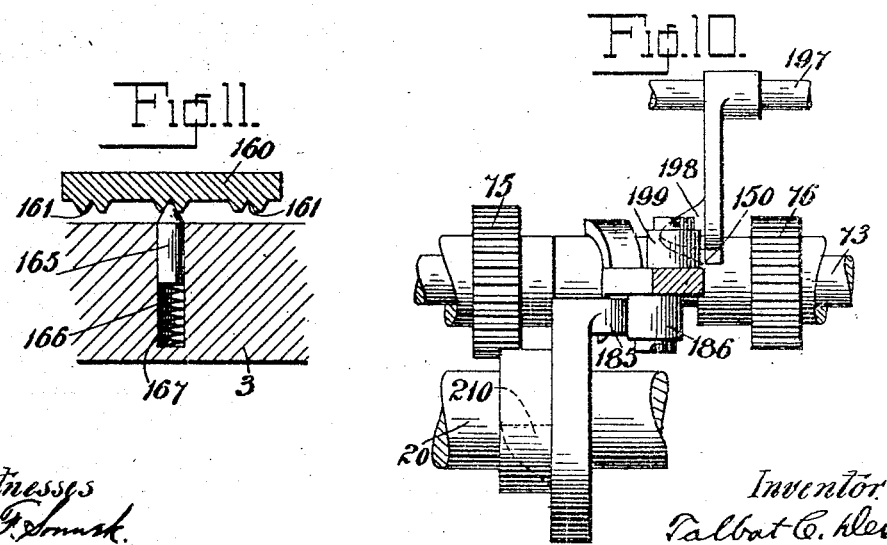
Witnesses
P. F. Smith
Wm. P. Hammond
Inventor
Talbot C. Dexter
By Knight Bro.
Attys.

No. 786,632.

Patented April 4, 1905.

UNITED STATES PATENT OFFICE.

TALBOT C. DEXTER, OF PEARL RIVER, NEW YORK.

PAPER-CUTTING MACHINE.

SPECIFICATION forming part of Letters Patent No. 786,632, dated April 4, 1905.

Application filed May 21, 1902. Serial No. 108,348.

*To all whom it may concern:*

Be it known that I, TALBOT C. DEXTER, a citizen of the United States, residing at Pearl River, in the county of Rockland and State of New York, have invented certain new and useful Improvements in Paper-Cutting Machines, of which the following is a specification.

My invention relates to improvements in power-operated paper-cutting machines in which the sheets to be cut are held firmly in proper position upon a supporting-table by means of a clamping-bar and are acted upon by a vertically-reciprocating laterally-movable cutting-blade, which is automatically thrown out of operation at the completion of each cutting stroke.

The object of my invention is to provide such a paper-cutting machine with an automatically-controlled power-operated clamping device which can exert a predetermined amount of pressure upon a pile of sheets and then automatically disconnect itself from the power or driving part of the machine and maintain the pressure upon the pile of sheets during the cutting operation while it is disconnected from the power. Such a mechanism is of great importance in economizing power, relieving the mechanism from all unnecessary strain, and producing a more effective and satisfactorily-operating machine generally.

I am aware that paper-cutting machines have been produced with power-operated clamping devices; but in all such machines known to me the power is constantly operating upon the clamp during the entire operation, with the result that there is a great loss of power in holding the clamp to its work and the machinery is subjected to unnecessary strain and wear.

In accomplishing my object I arrange between the power-shaft of the machine and the paper-clamping device an automatic and adjustable frictional clutch and a speed-governor controlling the clutch. The clutch is mounted upon a driven shaft and is set or adjusted to bind upon the shaft to a certain predetermined pressure and then to slip slightly upon the shaft. The speed-governor is geared to said driven shaft and is so connected with the movable part of the clutch that it will disengage the clutch from said driven shaft when its speed is reduced. With this arrangement the clutch will bind upon the driven shaft to force the clamping device into engagement with the pile up to a certain pressure, when it will slip upon its shaft for an instant and allow the shaft and the governor to slow down just enough to cause the governor to disengage the clutch from the shaft, which action will in turn allow the driven shaft, the governor, and the clamping device to come to a state of rest, the clamping device remaining in engagement with the pile and maintaining the desired pressure thereon during the descent of the knife. In addition to this structure I provide a reversing mechanism and tripping devices with automatically-operating devices for determining the direction of movement of the clamping device with relation to the pile and for arresting the operation of the machine at the completion of each operation. The clamp-operating mechanism is constructed to rapidly move the clamp into engagement with the pile, while the knife-operating mechanism causes the knife to operate more slowly. The clamp and knife start downwardly toward the pile at the same time; but before the knife reaches the pile the clamp has come to its position of rest, so as to securely hold the pile while the cutter is passing through the paper. When the knife reaches its lowest position after having passed through the paper, the reversing mechanism operates to positively throw in the friction-clutch and start up the operation of the clamp-operating means for moving the clamp upwardly away from the pile, the knife also starting to ascend at this moment. The operating means for the clamp and for the knife are automatically thrown out of operation when the clamp and knife reach their elevated position.

In producing my improved paper-cutting machine in practical form there are many details of construction which combine to produce the desired result, and in order that my invention may be fully understood I will now proceed to describe the same in detail, with reference to the accompanying drawings, and will afterward point out the novelty with more particularity in the annexed claims.

In said drawings, Figure 1 is a front elevation, partly broken away, of a paper-cutting machine embodying my improvements. Fig. 2 is a side elevation of the same with the near side frame or standard removed for the sake of clearness. Fig. 3 is a horizontal sectional view of the same cutting the standards a little beneath the paper-supporting table. Fig. 4 is a sectional front elevation of the adjustable frictional clutch for operating the paper-holding clamp. Fig. 5 is a detail front view of the main operating and controlling lever and the detachable connection between said lever and the operating-lever of the clutch mechanism which operates the knife. Fig. 6 is a detail longitudinal sectional view of the main clutch mechanism which controls the operation of the knife. Fig. 7 is a detail front elevation representing the reversing mechanism and the automatic clutch which connect the clamp-operating means with the power-shaft, also the governor which controls said clutch. Fig. 8 is a detail front elevation of the reversing clutch mechanism and controlling means for determining the direction of movement of the clamp and for automatically reversing the operation in the completion of the stroke of the cutter and for arresting the operation when the clamp reaches its inactive elevated position. Fig. 9 is a similar view showing the parts in the reversed position. Fig. 10 is a detail sectional plan view of the same mechanism. Fig. 11 is a detail sectional view of the spring-latch for determining and retaining the parts of said reversing clutch mechanism in the desired position.

The framework of my improved cutting-machine may be of any suitable construction to properly support the operating parts. In the drawings I have shown a heavily-built framework comprising the side frames or standards 1, securely braced and connected by the top rail 2, the center rail 3, and the bottom rail 4.

10 is the reciprocating cross-head carrying the cutter-blade 11 and mounted to slide vertically and transversely of the machine in the guide-slots 12, formed in the side frames or standards 1. The cross-head 10 is anchored to the top rail 2 by means of the ordinary link 13, which is pivotally connected at its opposite ends 14 and 15 to the cross-head and top rail, so as to cause the cross-head and cutter-blade carried thereby to move laterally of the machine as it reciprocates vertically to impart to the knife a shearing cut.

20 is the cutter-operating shaft, suitably journaled in the side frames or standards 1 in the bearings 21 and carrying at its outer ends the cranks 22, which are connected, through the jointed links 23, with the ends of the cross-head 10. By the rotation of shaft 20 the cutter-blade is caused to reciprocate vertically and transversely of the machine in the guideways formed in the side frames or standards in a manner well understood.

The cutter-operating shaft 20 is driven by means of a large gear 25, keyed to the shaft and meshing with a small gear 26, which is loosely journaled upon the power-shaft 27. The power-shaft 27 is suitably journaled in the machine-frame at 28 and carries upon one end the fast and loose pulleys 29 and 30 and upon its opposite end a fly-wheel 31. Power is applied to the shaft 27 by means of a belt operating upon fast pulley 29.

The small driving-gear 26 is formed integral with or rigidly secured to an extended hub 35, upon which is also mounted the clutch rim or wheel 36. The extended hub portion 35 is journaled within one of the bearings 28, while the power-shaft 27 is journaled within said hub 35.

The hub 35, carrying clutch-wheel 36 and small pinion 26, is loose upon shaft 27. The clutch-wheel 36 forms part of an ordinary expansion-rim clutch, of which the split clutch-ring 37 is mounted upon a hub portion 38, which is rigidly secured to the power-shaft 27, while the operating-finger 39 is journaled at one end of the split ring 37 and is formed with a heel which engages a lug formed on the other end of the split ring, so that when the finger 39 is moved outwardly the split ring or band will be expanded to frictionally engage the interior surface of the clutch rim or wheel 36. The finger 39 carries in its free end an adjustable screw-bolt 43, which is adapted to be engaged by an operating-spool 44, mounted to slide longitudinally upon shaft 27 and formed with an annular groove 45, in which engage the inwardly-projecting pins 46, carried by the yoke end 47 of a horizontally-movable operating-lever 48, the lever 48 being journaled at 49 beneath the paper-supporting table or platform 55.

It will be observed from the construction so far as described that when lever 48 is operated to move the operating-spool 44 inwardly toward the clutch 36 the clutch will be frictionally connected with the power-shaft 27 and will drive the small gear 26, which operates the large gear 25, which in turn rotates the operating-shaft 20 for driving the cutter-blade.

55 is the paper-supporting table or platform, which is rigidly mounted between the side frames or standards 1 in the usual manner.

56 is an ordinary adjustable back gage suitably mounted upon the table or platform 55 and controlled by the adjusting-screw 57, journaled in suitable lugs beneath the table 55 and carrying at its forward end an operating indicator-wheel 58.

65 is the paper-holding clamping-bar, which is mounted upon the vertically-extending side bars 66, which are seated in the guideways 67, formed in the inner faces of the side frames or standards 1. Projecting inwardly from the lower ends of the side bars 66 are the blocks or lugs 68, into which are threaded the vertically-extending operating-screws 69, which are journaled in bearing-blocks 70, projecting inwardly from the side frames of the machine, means being provided to prevent longitudinal movement of said screws. Each screw 69 carries at its lower end a bevel-gear 71, which meshes with a similar bevel-gear 72, the bevel-gears 72 being keyed to the opposite ends of a short clamp-operating shaft 73, suitably journaled in the bearings 74, mounted upon the bottom rail 4 of the machine-frame. This clamp-operating shaft 73 carries two gear-wheels 75 and 76, which are loosely journaled upon the shaft, said gears 75 and 76 being formed, respectively, with inner clutch-faces 77 and 78 for the purpose which will presently appear.

80 is a sliding reversing-clutch formed with oppositely-operating shoulders 81 and 82. The clutch 80 is mounted upon the clamp-operating shaft 73 and is adapted to move longitudinally thereon, it being splined to the shaft by means of a spline-and-groove connection, so as to rotate with the shaft, the spline being indicated at 83. By means of this clutch it will be clear that the shaft 73, which operates the clamp raising and lowering screws, can be driven in one direction by coupling up the gear 75 with the shaft and in the opposite direction by coupling up the gear 76 with the shaft.

I will now proceed to explain the means for driving the clamp-operating gears 75 and 76 and the automatic mechanism for controlling their operation.

Keyed to the main power-shaft 27 is a gear-wheel 90, which meshes with a smaller gear 91. The gear 91 is loosely journaled upon a rotatable intermediate shaft 92, which is in turn journaled in the side frames of the machine. This gear 91 is formed with an inner friction face or rim 93 at one side of its hub, with which engages a split friction-ring 94, carried by a hub portion 95, which is keyed to the shaft 92 a finger 96 being pivoted upon one end of the split ring 92 and formed with a heel 96$^a$, which engages a lug 94$^a$, formed on the other end of the split ring. When the finger 96 is moved outwardly on its pivot, the split ring or band 94 will be expanded to frictionally engage the interior surface of the clutch-rim 93 to lock gear 91 upon shaft 92. The finger 96 carries in its free end an adjustable screw-bolt 97, which is adapted to be engaged by an automatically-controlled operating-spool 98, which is mounted to slide longitudinally upon shaft 92. The spool 98 is formed with an annular groove 99, in which engage the inwardly-projecting pins 100, carried by the yoke end of an operating-lever 102, which is journaled at 103 upon a bracket 104, projecting inwardly from one of the side frames 1. The means for operating lever 102 and controlling-spool 98 will presently be described. This clutch which has just been described is of the same construction as the clutch 36 above referred to. The shaft 92 also carries two gear-wheels 105 and 106, which are keyed to the shaft and mesh, respectively, with the loose gear 75 on shaft 73 and an intermediate gear 107, which latter is mounted on the short shaft 107$^a$ (supported in suitable bearings, which are not shown) and in turn meshes with and drives the other loose gear 76 on shaft 73. The purpose of interposing the gear 107 between gears 106 and 76 is to rotate the gear 76 reversely to the direction of rotation of gear 75, the gear 76 operating the shaft 73 for moving the clamp downwardly into engagement with the pile and the gear 75 operating shaft 73 in a reverse direction for moving the clamp upwardly away from the pile. The governor-operating shaft 110 is suitably journaled in bearings 111 and carries between its ends a gear-wheel 112, which is in constant mesh with the gear 105.

113 is the vertically-extending rotatable governor-shaft, carrying a miter-gear 114 at its upper end, which meshes with a similar miter-gear 115, keyed to the shaft 110.

116 represents the governor-balls, mounted upon toggle-levers 117, the upper links of which are pivoted to a stationary collar, carried by the shaft 113, while the lower links are pivoted to a vertically-sliding sleeve 118, carrying a grooved collar 119, in the groove of which engage the inwardly-projecting pins 120, carried by the inner yoked end of a rock-arm 121, which is keyed to the rock-shaft 122, journaled in a bracket 123. This rock-shaft 122 also carries a rock-arm 125, which engages a vertically-movable rod 126, that is mounted in bearings in the bracket-arms 127, extending inwardly from one of the side frames of the machine. This vertically-movable rod 126 is adapted to engage the inclined face 128 of the cam-block 129, which is mounted upon the spool 98, said spool being splined to its shaft 92, so as to rotate therewith. When the rod 126 engages the cam-face 128 while the spool is rotating, it will be observed that the spool will be moved outwardly upon its supporting-shaft to disengage it from the clutch-operating finger 96 to release the clutch upon its supporting-shaft and allow the clamp-operating mechanism to come to a state of rest.

When the clutch 80 is in engagement with the clutch-face of loose gear 76, the clamp will be moved down into engagement with the pile, the clamp-operating shaft 73 being rotated for this purpose through gears 90 91, shaft 92, and gears 106, 107, and 76. When the clutch 80 is reversed and is in engagement with the clutch-face of loose gear 75, the clamp will be moved upwardly away from the pile, the shaft 73 being rotated for this purpose through gears 90 91, shaft 92, and gears 105 and 75.

150 is the clamp-operating lever, which actuates the reversing-clutch 80. This lever 150 is journaled at 151 and is formed with a yoked lower end 152, which straddles the clutch 80 and carries inwardly-projecting pins 153, which engage in the annular groove 80ᵃ of the sliding clutch 80. The rocking of this lever 150 by the means hereinafter described causes the clutch 80 to be moved longitudinally on the shaft 73 into one of three positions—namely, into engagement with the clutch-face of gear 75 at one extreme position, into engagement with the clutch-face of gear 76 in its other extreme position, or in central disengaged position, when the clamp and its operating mechanism will remain at rest.

155 is a rock-arm projecting from the lever 150 adjacent to its journal 151, and 156 is a connecting-rod journaled to the arm 155 at its upper end and formed with an elongated loop 157 at its lower end, in the slot of which loop engages a pin 158, mounted upon a rock-arm 159, projecting from the rock-shaft 122, above referred to.

The upper end of the lever 150 is formed with a T-head 160, in one face of which are formed the sockets 161. 165 is a pointed latch-pin seated in a cylindrical recess 166 in the central rail 3 of the machine-frame, a spiral spring 167 being mounted within said recess behind the latch-pin 165 to cause the said pin to move outwardly and engage in one of the sockets formed in the T-head of the lever 150.

175 is the main operating and controlling lever of the machine. This lever is journaled at 176 upon a suitable bracket-arm 177, secured to the central rail 3 of the machine-frame. The inner end of the lever 175 is connected by a link 178 with the operating-lever 150 of the clamp operating and reversing mechanism. The other end of the operating and controlling lever 115 is of cylindrical form to receive a rotatable handle 180, formed with a cylindrical socket 181, which fits over said outer cylindrical end of lever 175. This handle 180 has formed integral with it a laterally and inwardly projecting finger 182, which rests beneath a controlling gravity latch or hook 183, which latter is freely journaled at 184 upon the outer end of lever 175 just inside of the cylindrical portion of the handle 180. This gravity latch or hook 183 normally engages the outer end of the operating-lever 48 of the knife-driving clutch for throwing said clutch into operation when the main operating-lever 175 is shifted to the right of Figs. 1 and 3. The purpose of the rotatable handle 180 and finger 182 is to enable the operator to disengage the latch or hook 183 from the lever 48 when it is desired to operate and test the action of the clamp without operating the cutter.

185 is a face-cam keyed to the knife-operating shaft 20 and adapted to engage an antifriction-roller 186, journaled upon the lever 150, for the purpose of reversing the position of the clutch 80 and the operation of the clamp-operating means at the completion of the downward stroke of the cutter-blade and causing the ascent of the paper-clamping bar. This will be explained more fully in the description of the operation of the machine.

The upper end of lever 102 carries a pin 102ᵃ, which engages in the slot of an elongated slotted loop 188ᵃ, formed at one end of the link 188, which is pivotally connected at its other end, 189, with the lever 150. This connection between levers 150 and 102 is for the purpose of throwing into operation the clutch 93 94 when the operation of the clamp is reversed by lever 150.

190 is a short rock-shaft journaled in suitable brackets 191 upon one of the side frames adjacent to the top rail 2, and 192 is a rock-arm upon said shaft carrying an antifriction-roller 193, which is so located that when the paper-clamping bar ascends it will engage antifriction-roller 193 and rock the shaft 190. A rock-arm 194 is also keyed to the shaft 190, and depending from the arm 194 is a rod 195, which is journaled at its lower end to a rock-arm 196, keyed to a shaft 197, which is journaled in the side frames of the machine and carries a rocking face-cam 198, which is located to engage an antifriction-roller 199, journaled upon the clutch-operating lever 150. A second rod 200 is journaled to arm 194 and extends down through a guide 201 and carries a spring 202, which surrounds the rod and engages at its upper end an adjustable collar 203 and at its lower end the guide 201. This spring-actuated rod 200 serves to maintain the parts in normal operative position. The result of this construction is that when the paper-clamping bar reaches the limit of its upward stroke the cam 185 will shift the lever 150 and clutch 80 to central inactive position, and thereby arrest the operation of the clamp-operating means.

The knife-operating shaft 20 carries a second face-cam 210 for the purpose of returning the clutch-operating lever 48 to its normal inactive position to cause the release of the clutch 36 37 and free the cutter-operating mechanism from the power-shaft.

The operation of my improved paper-cutting machine may be described as follows: The power-shaft 27 is rotated continuously while the machine is operating, and the frictional clutch 93 94 is normally in clutched position, it being left in that position at the completion of each cutting operation, when the knife is brought to rest in elevated position by the release of clutch 36 37, and the clamp is brought to rest in elevated position by the release of the reversing-clutch 80. In the normal inactive position of the machine, therefore, the power-shaft 27, intermediate shaft 92, loose gears 75 76, and governor 116 117 are rotating. Assuming that the pile of paper to be cut is arranged in properly-gaged position upon the paper-supporting table 55 and the operator has previously adjusted the clutch 93 94 to clamp the pile with the desired power, the operator moves the operating-handle 180 to the right of Figs. 1 and 3, and thereby starts the operation of the machine, the several steps of the operation being then carried through automatically without further attention from the operator. The described movement of the operating-handle 180 shifts clutch 80 into engagement with the clutch-face of gear 76 and causes clutch 36 37 to connect driving-gear 26 with the power-shaft 27. The rotation of the driving-gear 26, operating through gear 25 and shaft 20, moves the cutter-blade downwardly for cutting the paper and upwardly again to its raised position, when clutch 36 37 is automatically thrown out to arrest the operation of the cutter-blade. Prior to the moment when the cutting-blade reaches the pile the clamp has moved into clamping position by the operation of gears 90 91, frictional clutch 93 94, intermediate shaft 92, gears 106, 107, and 76, clutch 80, shaft 73, gears 72 71, and screws 69. While the clamping-bar is moving downwardly into engagement with the pile, the rotation of shaft 92 will cause the governor to continue to rotate, and the movable collar 119 will be held in raised position, with the result that the vertically-movable rod 126 will be held in its lowered position out of the path of the cam-block 129, carried by the rotating spool 98. The machine will operate in this manner until the clamping-bar engages the pile of sheets with the predetermined degree of pressure. When the pressure of the clamping-bar upon the sheets has reached the required amount, the resistance to the clamp-operating means will be sufficient to overcome the frictional hold of the clutch 93 94, and the said clutch will slip slightly for an instant and allow a sufficient retardation of the shaft 92 to momentarily retard the speed of the governor, with the result that the collar 119 of the governor will drop sufficiently to rock shaft 122 and force the tripping-rod 126 upwardly into the path of the cam-block 129, carried by the rotating spool 98. The instant that the rod 126 engages the cam-face 128 of block 129 the spool 98 will be forced outwardly upon shaft 92, thereby disengaging itself from the clutch-operating arm 96 and completely throwing out the clutch 93 94 to allow gear 91 to rotate freely upon shaft 92 without further effect upon the clamp-operating means. Shaft 92 and all parts driven therefrom will then immediately come to a standstill. The pitch of the screws 69 and the friction of the intermeshing beveled gears 71 72 afford sufficient resistance to lock the clamping-bar securely in place in engagement with the pile. This operation takes place very rapidly, so that the clamping-bar will reach its clamping position and be disengaged from its operating mechanism just prior to the instant when the descending knife reaches the pile of paper. The knife continues downwardly through the paper and completes the cutting operation and then starts to return to raised position. Then the cam 185 engages antifriction-roller 186 upon lever 150 and shifts the clutch 80 to its opposite position, thereby freeing the gear 76 and locking the gear 75 upon the shaft 73. This shifting of lever 150 also rocks the lever 102 (through link 188) for moving the clutch-controlling spool 98 inwardly toward the clutch 93 94 to throw the clutch into clutching position again for binding gear 91 upon shaft 92. At the same time the shifting of lever 150 rocks shaft 122 to withdraw the rod 126 from the path of the cam-block 129 and for forcibly raising the sliding collar 119 of the governor. The clamp-operating means start up the moment the lever 150 is shifted by cam 185, and as the shaft 73 will be rotated in an opposite direction through gears 90 91, shaft 92, and gears 105 and 75 it will be observed that the clamp-operating screws 69 will be rotated to move the clamp upwardly away from the pile of sheets. It will of course be observed that the governor also immediately starts as the shaft 92 rotates, so that the throw-out rod 126 will be held down out of the path of the rotating cam 129 of the spool 98. As soon as the knife and clamping-bar reach their raised position the cam 210 will shift the operating-lever 48 to the left for releasing the clutch 36 37 and the clamping-bar will strike the tripping-arm 192 for rocking the face-cam 198, which shifts the lever 150 to its central position, thereby moving the sliding clutch 80 into central inactive position, disengaged from the clutch-face of both of the gears 75 and 76 of shaft 73 and allowing the clamp to come to rest in its elevated position. As stated above, the frictional clutch 93 94 remains in clutched position in readiness for the succeeding operation. When reversing-clutch 80 is shifted from loose gear 76 to loose gear 75 through the operation of cam 185 upon lever 150, the operating-handle 180 and connected gravity-hook 183 (which latter rests and slides on lever 48) are shifted from their extreme right-hand position to their extreme left-hand position, allowing lever 48 to remain in its shifted right-hand position. When lever 150 is shifted into central position to bring clutch 80 into central inactive position, the handle 180 and hook 183 will be brought into their central inactive position, which position of the hook allows sufficient space for the free movement of lever 48 into its normal throw-out position. The central inactive position of hook 183 corresponds with the left-hand or throw-out position of lever 48, in which position the hook engages the lever in readiness for starting the succeeding operation of the machine. The loop end 188ª of the link 188 engaging the pin 102ª of lever 102 is for the purpose of allowing the automatic throw-out of the frictional clutch 93 94 by the action of the governor without interfering with the reversing-lever 150 and for the purpose of allowing the reversing-lever 150 to be shifted into its central inactive position or its extreme shifted position for starting the machine, as shown in full lines in Fig. 7, without interfering with the frictional clutch 93 94. The only movement of the reversing-lever 150 which is transferred to the clutch-actuating lever 102 is when the lever 150 is shifted into the position shown in dotted lines in Fig. 7 for reversing the clutch 80, when the inner end of loop 188ª will actuate the lever 102 to throw in the clutch 93 94. In all other movements of the lever 150 or the lever 102 the pin 102ª and loop 188ª move relatively one upon the other.

The purpose of the loop end 157 of rod 156 engaging the pin 158 on arm 159 is to allow the free relative movement of the parts under the action of the governor for shifting the throw-out rod 126 without interfering with the position of the reversing-lever 150 and also for the purpose of allowing the movement of reversing-lever 150 into the position shown in full lines in Fig. 7 and into its central inactive position without interfering with the action of the governor, which normally holds the rod 126 in its lowered inactive position. The only movement of the reversing-lever 150 which is transferred to the clutch-throw-out device is its movement into the shifted position shown in dotted lines in Fig. 7, in which case the throw-out rod 126 is forcibly moved into its lowered inactive position to allow the positive throwing in of the clutch 93 94 through means of rod 188, lever 102, and spool 98.

If it is desired to test the operation of the clamp without operating the cutter, the operator simply rotates the handle 180 slightly to the right of Fig. 3, raising and disengaging the latch 183 from lever 48 and moving the handle end of lever 175 to the right, as in the full operation above described. The clamping-bar will then be automatically lowered and raised, as just described; but the cutter will not be operated, because the clutch 36 will remain inactive.

The power with which the clamp will be forced into engagement with the pile of sheets is determined by the adjustment of the screw 97 on the clutch-operating arm 96 with relation to spool 98.

The feature of greatest importance in my invention, as above set forth, consists of the means whereby the paper-clamping bar can be automatically moved into engagement with the pile by the power of the machine, retained in such engagement with the desired pressure, and then automatically thrown out of gear with the power-shaft to relieve the machine of the strain which would result if the power-shaft of the machine were continually acting upon the clamp-operating mechanism during the entire cutting operation of the machine. I desire to claim this feature broadly.

In effect my machine operates the paper-holding clamp automatically in a manner very similar to paper-cutting machines which have hand-operated clamping devices. The clamp is applied to the required degree of pressure, and the power is then disconnected from the clamp in substantially the same manner as the operator throws the clamp down upon the pile by hand.

Having thus described my invention, the following is what I claim as new therein and desire to secure by Letters Patent:

1. In a paper-cutting machine, the combination of a paper-cutting knife, suitable operating mechanism for the knife including a rotary shaft, a paper-holding clamp, suitable clamp-operating means, automatic controlling means adapted to effect the operative connection between the clamp and its operating means for moving the clamp into engagement with the pile of sheets, and then automatically disconnect the clamp from its operating means while the paper-cutting knife is operating, and a cam upon said knife-operating shaft adapted to automatically effect the raising of the clamp from the pile after the completion of the downward stroke of the knife, substantially as set forth.

2. In a paper-cutting machine, the combination of a paper-cutting knife, suitable operating mechanism for the knife, a paper-holding clamp, suitable clamp-operating means, automatic controlling means adapted to effect the operative connection between the clamp and its operating means for moving the clamp into engagement with the pile of sheets, and then automatically disconnect the clamp from its operating means while the paper-cutting knife is operating, means for automatically raising the clamp from the pile after the completion of the cutting operation, and a tripping device, actuated by the upward movement of the clamp, adapted to arrest the movement of the clamp, substantially as set forth.

3. In a paper-cutting machine, the combination of a paper-cutting knife, suitable operating mechanism for the knife, a paper-holding clamp, suitable clamp-operating means, and automatic controlling means adapted to effect the operative connection between the clamp and its operating means for moving it into engagement with the pile of sheets, then disconnect the clamp from its operating means while the paper-cutting knife is operating, and finally again connect the clamp with its operating means for raising the clamp from the paper, substantially as set forth.

4. In a paper-cutting machine, the combination of a paper-cutting knife, suitable operating mechanism for the knife, a paper-holding clamp, suitable clamp-operating means, and automatic controlling means adapted to effect the operative connection between the clamp and its operating means for moving it into engagement with the pile of sheets, then disconnect the clamp from its operating means while the paper-cutting knife is operating, then again connect the clamp with its operating means and reverse the operating means for raising the clamp from the paper, and finally disconnect the clamp from its operating means, substantially as set forth.

5. In a paper-cutting machine, the combination of a pile-supporting table, a paper-cutting knife and its operating mechanism, with a paper-holding clamp, suitable clamp-operating mechanism including a clutch and a part which is adapted to be retarded by the engagement of the clamp with a pile of sheets upon the table, and a governor actuated by said part which is adapted to be retarded, said governor being adapted to automatically throw out said clutch when said part is retarded to thereby disconnect the clamp from its operating mechanism, substantially as set forth.

6. In a paper-cutting machine, the combination of a pile-supporting table, a paper-cutting knife and its operating mechanism, with a paper-holding clamp, suitable clamp-operating mechanism including a clutch and a part which is adapted to be retarded by the engagement of the clamp with a pile of sheets upon the table, a governor actuated by said part which is adapted to be retarded, said governor being adapted to automatically throw out said clutch when said part is retarded to thereby disconnect the clamp from its operating mechanism, and means for automatically raising the clamp from the pile after the completion of the cutting operation, substantially as set forth.

7. In a paper-cutting machine, the combination of a pile-supporting table, a paper-cutting knife and its operating mechanism, with a paper-holding clamp, suitable clamp-operating mechanism including a frictional clutch and a part which is adapted to be retarded by the engagement of the clamp with the pile of sheets upon the table, and a governor actuated by the retardation of said part of the operating mechanism and adapted to automatically throw out said frictional clutch, substantially as set forth.

8. In a paper-cutting machine, the combination of a pile-supporting table, a paper-cutting knife and its operating mechanism, with a paper-holding clamp, suitable clamp-operating mechanism including two clutches one of which is a frictional clutch, a shaft which is adapted to be retarded by the engagement of the clamp with a pile of sheets upon the table, a governor actuated by said shaft which is adapted to be retarded, and means actuated by said governor adapted to automatically throw out said clutches to thereby disconnect the clamp from its operating mechanism, substantially as set forth.

9. In a paper-cutting machine, the combination of a pile-supporting table, a paper-cutting knife and its operating mechanism, with a paper-holding clamp, suitable clamp-operating mechanism, including a shaft and a frictional clutch, part of said frictional clutch being rigidly fixed upon said shaft while the other part of said clutch is adapted to rotate upon this fixed part, whereby said shaft will be retarded by the engagement of the clamp with the pile of sheets upon the table, and a governor actuated by the retardation of said shaft and adapted to automatically throw out said clutch, substantially as set forth.

10. In a paper-cutting machine, the combination of a pile-supporting table, a paper-cutting knife, and its operating mechanism, with a paper-holding clamp, suitable clamp-operating mechanism having a part which is adapted to be retarded by the engagement of the clamp with a pile of sheets, means actuated by the retardation of said part of the operating mechanism, adapted to automatically disconnect the clamp from its operating mechanism, and means adapted to automatically reverse the action of the clamp-operating mechanism and connect it up with the clamp for raising the clamp from the pile, substantially as set forth.

11. In a paper-cutting machine, the combination of a pile-supporting table, a paper-cutting knife, and knife-operating mechanism, with a paper-holding clamp, suitable clamp-operating mechanism having a part which is adapted to be retarded by the engagement of the clamp with a pile of sheets, means, actuated by the retardation of said part of the operating mechanism, adapted to automatically disconnect the clamp from its operating mechanism, and means, actuated by the knife-operating mechanism, adapted to automatically reverse the action of the clamp-operating mechanism and connect it up with the clamp for moving the clamp away from the pile, substantially as set forth.

12. In a paper-cutting machine, the combination of a pile-supporting table, a paper-cutting knife, and knife-operating mechanism, with a paper-holding clamp, suitable clamp-operating mechanism having a part which is adapted to be retarded by the engagement of the clamp with a pile of sheets, means, actuated by the retardation of said part of the operating mechanism, adapted to automatically disconnect the clamp from its operating mechanism, means, actuated by the knife-operating mechanism, adapted to automatically reverse the action of the clamp-operating mechanism and connect it up with the clamp, and means for automatically arresting the operation of the knife and clamp at the completion of their movements, substantially as set forth.

13. In a paper-cutting machine, the combination of a pile-supporting table, a paper-cutting knife, and knife-operating mechanism, with a paper-holding clamp, suitable clamp-operating mechanism having a part which is adapted to be retarded by the engagement of the clamp with a pile of sheets, means actuated by the retardation of said part of the operating mechanism, adapted to automatically disconnect the clamp from its operating mechanism, means, actuated by the knife-operating mechanism, adapted to automatically reverse the action of the clamp-operating mechanism and connect it up with the clamp, and hand-operated controlling means adapted to start the operation of the machine, substantially as set forth.

14. In a paper-cutting machine, the combination of a power-shaft, a paper-cutting knife, and means driven by said power-shaft for operating said knife, with a paper-holding clamp, suitable clamp-operating means, a frictional clutch interposed between the power-shaft and clamp-operating means, a governor geared to the clamp-operating means, and suitable means operated by the governor for throwing out said clutch, substantially as set forth.

15. In a paper-cutting machine, the combination of a power-shaft, a paper-cutting knife, and knife-operating means, a paper-holding clamp, suitable clamp-operating means including an adjustable frictional clutch, a clutch-operating device, and a governor geared to the clamp-operating means and suitably connected with the clutch-operating device, substantially as set forth.

16. In a paper-cutting machine, the combination of a power-shaft, a paper-cutting knife, and suitable knife-operating means, a paper-holding clamp, suitable clamp-operating means, an adjustable frictional clutch interposed between the power-shaft and clamp-operating means, a clutch-operating device, a governor geared to the clamp-operating means and suitably connected with the clutch-operating device, and means adapted to automatically raise the clamp from the pile after the completion of the cutting operation, substantially as set forth.

17. In a paper-cutting machine, the combination of a power-shaft, a paper-cutting knife, and suitable knife-operating means, a paper-holding clamp, suitable clamp-operating means, an adjustable frictional clutch interposed between the power-shaft and clamp-operating means, a clutch-operating device, a governor geared to the clamp-operating means and suitably connected with the clutch-operating device, and means adapted to automatically reverse the clutch-operating means, substantially as set forth.

18. In a paper-cutting machine, the combination of a power-shaft, a paper-cutting knife, and suitable knife-operating means, a paper-holding clamp, suitable clamp-operating means, an adjustable frictional clutch interposed between the power-shaft and clamp-operating means, a clutch-operating device, a governor geared to the clamp-operating means and suitably connected with the clutch-operating device, means adapted to automatically reverse the clutch-operating means, and a tripping device, actuated by the upward movement of the clamp, adapted to arrest the movement of the clamp, substantially as set forth.

19. In a paper-cutting machine, the combination of a power-shaft, a paper-cutting knife, and suitable knife-operating means, a paper-holding clamp, suitable clamp-operating means, an adjustable frictional clutch interposed between the power-shaft and clamp-operating means, a clutch-operating device, a governor geared to the clamp-operating means and suitably connected with the clutch-operating device, means adapted to automatically raise the clamp from the pile after the completion of the cutting operation, and a tripping device, actuated by the upward movement of the clamp, adapted to arrest the movement of the clamp, substantially as set forth.

20. In a paper-cutting machine, the combination of a power-shaft, a paper-cutting knife having suitable operating means, a paper-holding clamp, suitable clamp-operating means, a reversing-clutch included in the clamp-operating means, a frictional clutch interposed between the power-shaft and clamp-operating means, and automatic means for operating said clutches, substantially as set forth.

21. In a paper-cutting machine, the combination of a power-shaft, a paper-cutting knife having suitable operating means, a paper-holding clamp, suitable clamp-operating means, a reversing-clutch included in the clamp-operating means, a frictional clutch interposed between the power-shaft and clamp-operating means, a governor geared to the clamp-operating means and adapted to throw out said frictional clutch, and automatic means for operating said reversing-clutch, substantially as set forth.

22. In a paper-cutting machine, the combination of a power-shaft, a paper-cutting knife having suitable operating means, a paper-holding clamp, suitable clamp-operating means, a reversing-clutch included in the clamp-operating means, a frictional clutch interposed between the power-shaft and clamp-operating means, a governor geared to the clamp-operating means and adapted to throw out said frictional clutch, automatic means for shifting said reversing-clutch from one extreme position to another extreme position, and automatic means operated by the upward movement of the paper-holding clamp adapted to shift said reversing-clutch to its central inactive position, substantially as set forth.

23. In a paper-cutting machine, the combination of a paper-cutting knife, suitable knife-operating mechanism, a paper-holding clamp, suitable clamp-operating mechanism, means adapted to automatically disconnect the clamp from its operating mechanism when the clamp engages the pile, a reversing-clutch included in the clamp-operating means, and means operated by the knife-operating mechanism adapted to automatically shift said reversing-clutch and connect up the clamp with its operating mechanism, substantially as set forth.

24. In a paper-cutting machine, the combination of a paper-cutting knife, a knife-operating shaft, a power-shaft geared to the knife-operating shaft, a paper-holding clamp, suitable clamp-operating means, a reversing-clutch included in the clamp-operating means, a clutch-operating lever, and a cam on the knife-operating shaft adapted to automatically operate said lever, substantially as set forth.

25. In a paper-cutting machine, the combination of a paper-cutting knife, and knife-operating means, with a paper-holding clamp, operating mechanism adapted to move the clamp into engagement with a pile and then automatically disengage itself from the clamp, leaving the clamp in engagement with the pile, a reversing-clutch included in the clamp-operating mechanism, and automatic means for operating said reversing-clutch, substantially as set forth.

26. In a paper-cutting machine, the combination of a power-shaft, a paper-cutting knife, and mechanism for operating said knife, including a rotary shaft, with a paper-holding clamp, clamp-operating means driven by said power-shaft, automatic controlling means adapted to disconnect the clamp-operating means from the power-shaft, a reversing-clutch included in the clamp-operating means, and means actuated by the rotary knife-operating shaft adapted to automatically shift said reversing-clutch and connect up the clamp-operating means with the power-shaft, substantially as set forth.

27. In a paper-cutting machine, the combination of a power-shaft, a paper-cutting knife, mechanism driven by said power-shaft for operating said knife, with a paper-holding clamp, suitable clamp-operating means adapted to be driven by said power-shaft, suitable automatic controlling means adapted to maintain operative connection between the power-shaft and clamp-operating means up to a certain predetermined pressure and then to automatically disconnect the clamp-operating means from the power-shaft, a reversing-clutch included in the clamp-operating means, and automatic means, actuated by the knife-operating mechanism, adapted to shift said reversing-clutch, substantially as set forth.

28. In a paper-cutting machine, the combination of a power-shaft, a paper-cutting knife, and mechanism driven by said power-shaft for operating said knife, with a paper-holding clamp, suitable clamp-operating means, a frictional clutch interposed between the power-shaft and clamp-operating means, a governor geared to the clamp-operating means and controlling the said clutch, whereby the clamp-operating means will be thrown out of operative connection with the power-shaft when the clamp engages the pile of sheets, a reversing-clutch included in the clamp-operating means, and automatic controlling means adapted to shift said reversing-clutch and throw in said frictional clutch, substantially as set forth.

29. In a paper-cutting machine, the combination of a power-shaft, a paper-cutting knife, and mechanism driven by said power-shaft for operating said knife, with a paper-holding clamp, suitable clamp-operating means, a frictional clutch interposed between the power-shaft and clamp-operating means, a governor geared to a part of the clamp-operating means between the frictional clutch and the clamp, suitable means operated by the governor, for throwing out said frictional clutch, a reversing-clutch included in the clamp-operating means, and automatic controlling means adapted to shift said reversing-clutch and throw in said frictional clutch, substantially as set forth.

30. In a paper-cutting machine, the combination of a paper-cutting knife, a paper-clamp, power-actuated means for operating the knife and clamp, and manually-operated controlling means constructed and arranged to cause the operation of the clamp alone or of the knife and clamp in unison, at the will of the operator, substantially as set forth.

31. In a paper-cutting machine, the combination of a paper-cutting knife, means for operating said cutting-knife, a power-shaft, a clutch interposed between the power-shaft and operating mechanism, a paper-clamp having suitable operating mechanism, a clutch interposed between the power-shaft and clamp-operating mechanism, and a manually-operated controlling device connected with said clutches and adapted to operate them separately or in unison, as set forth.

32. In a paper-cutting machine, the combination of a knife, and suitable knife-operating mechanism, with a clamping-bar, an operating-shaft suitably connected with said clamping-bar for raising and lowering it, two gears loosely journaled upon said operating-shaft, a sliding clutch splined upon said operating-shaft and located between said gears, operating means whereby said clutch may be shifted to lock either of said gears upon the operating-shaft, a power-shaft, power-transmitting mechanism geared to said power-shaft and to the loosely-mounted gears upon said operating-shaft, a frictional clutch included in said power-transmitting mechanism, a governor geared to said power-transmitting mechanism, and a clutch-tripping device connected with said governor and adapted to throw out said frictional clutch, substantially as set forth.

33. In a paper-cutting machine, the combination of a knife, suitable knife-operating mechanism, a power-shaft, a paper-holding clamp, a clamp-operating shaft, two loosely-mounted gears carried by said clamp-operating shaft, an intermediate shaft, gears keyed to said intermediate shaft and meshing with said loosely-mounted gears of the clamp-operating shaft, a driving-gear upon the power-shaft, a gear loosely mounted upon said intermediate shaft and meshing with said driving-gear upon the power-shaft, a frictional clutch interposed between said intermediate shaft and the loosely-mounted gear thereon, a governor geared to said intermediate shaft, a clutch-tripping device connected with the governor and adapted to throw out said frictional clutch, and a reversing-clutch upon the clamp-operating shaft adapted to lock either of the gears thereon, substantially as set forth.

34. In a paper-cutting machine, the combination of a power-shaft, a paper-cutting knife, a cutter-operating shaft suitably geared with the power-shaft, a paper-holding-clamp-operating means for raising and lowering the paper-holding clamp, including an operating-shaft carrying two loosely-mounted gears, and a reversing-clutch mounted upon the operating-shaft and adapted to lock either of said gears upon the shaft, a clutch-operating lever, and a cam mounted upon the cutter-operating shaft and adapted to engage said clutch-operating lever for reversing the operation of the paper-holding clamp, substantially as set forth.

35. In a paper-cutting machine, the combination of a power-shaft, a paper-cutting knife, a cutter-operating shaft suitably geared with the power-shaft, a paper-holding clamp, operating means for raising and lowering the paper-holding clamp, including an operating-shaft carrying two loosely-mounted gears, and a reversing-clutch mounted upon the clamp-operating shaft and adapted to lock either of said gears upon said shaft, a clutch-operating lever, a cam mounted upon the cutter-operating shaft and adapted to engage said clutch-operating lever for reversing the operation of the paper-holding clamp, and a tripping device adapted to be engaged by the upward movement of the paper-holding clamp, and by its movement throw the clutch-operating lever into its inoperative position for arresting the upward movement of the clamp, substantially as set forth.

36. In a paper-cutting machine, the combination of a power-shaft, a paper-cutting knife, a cutter-operating shaft, gearing between the power-shaft and cutter-operating shaft including a cutter-controlling clutch, an operating-lever for said cutter-controlling clutch, a paper-holding clamping-bar, operating means suitably geared with the power-shaft for moving the clamping-bar downwardly and upwardly, a clamp-controlling clutch included in its operating means, an operating-lever for said clamp-controlling clutch, a cam upon the cutter-operating shaft adapted to engage the operating-lever of the clamp-controlling clutch for reversing its position, and a second cam upon the cutter-operating shaft adapted to operate the lever of the knife-controlling clutch for throwing the knife out of operation, substantially as set forth.

37. In a paper-cutting machine, the combination of a power-shaft, a paper-cutting knife, a cutter-operating shaft, gearing between the power-shaft and cutter-operating shaft including a cutter-controlling clutch, an operating-lever for said cutter-controlling clutch, a paper-holding clamping-bar, operating means suitably geared with the power-shaft for moving the clamping-bar downwardly and upwardly, a clamp-controlling clutch included in its operating means, an operating-lever for said clamp-controlling clutch, means connecting the operating-lever of the clamp-controlling clutch with the operating-lever of the knife-controlling clutch whereby said clutches may be thrown into operation simultaneously, a cam upon the cutter-operating shaft adapted to engage the operating-lever of the clamp-controlling clutch for reversing its position, and a second cam upon the cutter-operating shaft adapted to operate the lever of the knife-controlling clutch for throwing the knife out of operation, substantially as set forth.

38. In a paper-cutting machine, the combination of a power-shaft, a paper-cutting knife, a cutter-operating shaft, gearing between the power-shaft and cutter-operating shaft including a cutter-controlling clutch, an operating-lever for said cutter-controlling clutch, a paper-holding clamping-bar, operating means suitably geared with the power-shaft for moving the clamping-bar downwardly and upwardly, a clamp-controlling clutch included in its operating means, an operating-lever for said clamp-controlling clutch, means connecting the operating-lever of the clamp-controlling clutch with the operating-lever of the knife-controlling clutch, a cam upon the cutter-operating shaft adapted to engage the operating-lever of the clamp-controlling clutch for reversing its position, a second cam upon the cutter-operating shaft adapted to operate the lever of the knife-controlling clutch for throwing the knife out of operation, and a tripping device arranged to be operated by the upward movement of the clamping-bar and adapted to engage the operating-lever of the clamp-controlling clutch to shift said clutch into its central inactive position, substantially as set forth.

39. In a paper-cutting machine, the combination of a paper-cutting knife and suitable cutter-operating mechanism, with a paper-holding clamp, suitable clamp-operating mechanism, a clutch included in said clamp-operating mechanism, a clutch-controlling lever, a rocking cam adapted to engage said lever, and a rock-arm suitably connected with said rocking cam and mounted in the path of the clamp and adapted to be engaged by the clamp upon its upward movement, substantially as set forth.

40. In a paper-cutting machine, the combination of a paper-cutting knife and suitable knife-operating mechanism, with a paper-clamping bar, suitable clamp-operating means, a clutch included in said clamp-operating means, a clutch-operating lever, a rocking cam adapted to engage said lever, a rock-shaft upon which said cam is mounted, a second rock-shaft carrying a rock-arm which is supported in the path of the upward movement of the clamp, suitable means connecting the two rock-shafts, and a spring device holding said parts in their normal operative position, substantially as set forth.

41. In a paper-cutting machine, the combination of a paper-cutting knife, and suitable knife-operating mechanism, with a paper-holding clamp, suitable clamp - operating means, a frictional clutch included in said clamp-operating means, an operating-lever actuating said frictional clutch, a reversing-clutch also included in said clamp-operating means, a reversing-lever, means for automatically operating said reversing-lever, and suitable means connecting said reversing-lever with the operating-lever of the frictional clutch, substantially as set forth.

42. In a paper-cutting machine, the combination of a paper-cutting-knife, and suitable knife-operating mechanism, with a paper-holding clamp, suitable clamp - operating means, a frictional clutch included in said clamp-operating means, an operating-lever actuating said frictional clutch, a reversing-clutch also included in said clamp-operating means, a reversing-lever, means for automatically operating said reversing-lever, a rod pivotally connected at one end to said reversing-lever, and a pin-and-slot connection between the other end of said rod and the operating-lever of the frictional clutch, substantially as set forth.

43. In a paper-cutting machine, the combination of a paper-cutting knife, and suitable knife-operating mechanism, with a paper-holding clamp, suitable clamp - operating means, a frictional clutch included in the clamp-operating means, a governor geared to said clamp-operating means, suitable devices connected with and actuated by the governor adapted to throw out the frictional clutch, an operating-lever adapted to throw in said frictional clutch, a reversing-clutch also included in said clamp-operating means, an operating-lever for said reversing-clutch, means for automatically operating the lever of said reversing-clutch, a connection between said reversing-lever and the operating-lever of the frictional clutch, and a suitable connection between said reversing-lever and the governor-operated throw-out devices, substantially as set forth.

44. In a paper-cutting machine, the combination of a paper-cutting knife, and suitable knife-operating mechanism, with a paper-holding clamp, suitable clamp - operating mechanism, a frictional clutch included in said clamp-operating mechanism, a lever adapted to operate said frictional clutch, a governor geared to said clamp-operating mechanism, throw-out devices controlled by said governor and adapted to automatically throw out said frictional clutch, a reversing-clutch included in said clamp-operating means, a lever operating said reversing-clutch, means for automatically actuating said reversing-lever, connecting-rods connecting said reversing-lever with the operating-lever of the frictional clutch and with the governor - controlled throw-out devices, said connecting-rods having pin-and-slot connections with the parts connected, substantially as set forth.

45. In a paper-cutting machine, the combination of a paper-cutting knife and knife-operating mechanism, a paper-holding clamp, suitable clamp-operating means, a frictional clutch included in said clamp-operating means, a sliding clutch-controlling spool, a cam-block mounted upon said spool, a throw-out rod or bar adapted to be projected into the path of said cam, a governor, and suitable devices connecting the governor with said throw-out rod or bar, substantially as set forth.

46. In a paper-cutting machine, the combination of a power-shaft, a paper-cutting knife, suitable knife-operating mechanism, a clutch interposed between the power-shaft and said knife-operating mechanism, with an operating-lever controlling said knife-clutch, a paper-holding clamp, suitable clamp-operating means, a clutch included in said clamp-operating means, a controlling-lever suitably connected with said clamp-operating clutch, and means detachably connecting the controlling-lever with the operating-lever of the knife-clutch, substantially as set forth.

47. In a paper-cutting machine, the combination of a power-shaft, a paper-cutting knife, suitable knife-operating mechanism, a clutch interposed between the power-shaft and said knife-operating mechanism, with an operating-lever controlling said knife-clutch, a paper-holding clamp, suitable clamp-operating means, a clutch included in said clamp-operating means, a controlling-lever suitably connected with said clamp-operating clutch, and an arm freely journaled upon the controlling-lever and formed with a hook upon its free end which is adapted to normally engage the operating-lever of the knife-clutch, substantially as set forth.

48. In a paper-cutting machine, the combination of a power-shaft, a paper-cutting knife, suitable knife-operating mechanism, a clutch interposed between the power-shaft and said knife-operating mechanism, with an operating-lever controlling said knife-clutch, a paper-holding clamp, suitable clamp-operating means, a clutch included in said clamp-operating means, a controlling-lever suitably connected with said clamp-operating clutch, an arm freely journaled upon said controlling-lever and formed with a hook upon its free end which is adapted to normally engage the operating-lever of the knife-clutch, and a rotatable handle journaled upon the outer end of said controlling-lever and carrying a finger which rests normally beneath the hook-arm, stantantially as set forth.

TALBOT C. DEXTER.

Witnesses:
J. GREEN,
WM. E. KNIGHT.